United States Patent
Wennersten et al.

(10) Patent No.: US 12,113,969 B2
(45) Date of Patent: Oct. 8, 2024

(54) VIDEO CODING INVOLVING GOP-BASED TEMPORAL FILTERING

(71) Applicant: Telefonaktiebolaget LM Ericsson (publ), Stockholm (SE)

(72) Inventors: Per Wennersten, Årsta (SE); Johan Östrand, Knivsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 265 days.

(21) Appl. No.: 17/437,858

(22) PCT Filed: Mar. 10, 2020

(86) PCT No.: PCT/SE2020/050260
§ 371 (c)(1),
(2) Date: Sep. 10, 2021

(87) PCT Pub. No.: WO2020/185152
PCT Pub. Date: Sep. 17, 2020

(65) Prior Publication Data
US 2022/0174277 A1  Jun. 2, 2022

Related U.S. Application Data

(60) Provisional application No. 62/816,617, filed on Mar. 11, 2019.

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/172* (2014.11); *H04N 19/80* (2014.11)

(58) Field of Classification Search
CPC .. H04N 19/117; H04N 19/105; H04N 19/172; H04N 19/80
See application file for complete search history.

(56) References Cited

U.S. PATENT DOCUMENTS 10,380,751 B1 *  8/2019  Jones ................. H04N 23/16
2002/0141503 A1 * 10/2002  Kobayashi ......... H04N 19/61
                                                           375/E7.211

(Continued)

FOREIGN PATENT DOCUMENTS

CA      2971911     *   6/2012
CN    106358041     *   8/2016

(Continued)

OTHER PUBLICATIONS

Zhu CN Translation of 106358041 Aug. 2016 (Year: 2016).*

(Continued)

*Primary Examiner* — Zaihan Jiang
(74) *Attorney, Agent, or Firm* — Sage Patent Group

(57) ABSTRACT

A method for encoding a video signal includes receiving an input including a sequence of pictures. A subset of the pictures from the sequence is selected. The selected subset of the pictures from the sequence is then filtered. The filtered selected subset of the pictures, and unfiltered pictures not in the selected subset, are then applied to an encoder to produce an encoded signal.

18 Claims, 7 Drawing Sheets

(51) Int. Cl.
*H04N 19/172* (2014.01)
*H04N 19/80* (2014.01)

(56) References Cited

U.S. PATENT DOCUMENTS

| | | | | |
|---|---|---|---|---|
| 2005/0244076 A1* | 11/2005 | Ratakonda | ............ | H04N 19/436 |
| | | | | 375/E7.103 |
| 2006/0120454 A1* | 6/2006 | Park | ..................... | H04N 19/513 |
| | | | | 375/E7.125 |
| 2008/0101469 A1* | 5/2008 | Ishtiaq | ..................... | G06T 5/70 |
| | | | | 375/E7.193 |
| 2009/0207912 A1 | 8/2009 | Holcomb | | |
| 2011/0200108 A1* | 8/2011 | Joshi | ..................... | H04N 19/186 |
| | | | | 375/E7.123 |
| 2012/0033728 A1* | 2/2012 | Cho | ..................... | H04N 19/124 |
| | | | | 375/240.03 |
| 2012/0155533 A1* | 6/2012 | Puri | ..................... | H04N 19/117 |
| | | | | 375/E7.126 |
| 2017/0094285 A1* | 3/2017 | Said | ..................... | H04N 19/70 |
| 2018/0343448 A1 | 11/2018 | Possos et al. | | |

FOREIGN PATENT DOCUMENTS

| | | | |
|---|---|---|---|
| CN | 110024401 | * | 1/2018 |
| JP | 5060947 | * | 5/2005 |
| WO | WO-2004054158 | * | 6/2004 |
| WO | WO 2018/118134 A1 | | 6/2018 |
| WO | WO 2021/073631 A1 | | 4/2021 |

OTHER PUBLICATIONS

Zhang Translation of CN 110024401 Jan. 2018 (Year: 2018).*
Zhu CN Translation of CN106358041 Aug. 2016 (Year: 2016).*
Jérôme Villon Translation of JP 5060947 May 2, 2005 (Year: 2005).*
Supplementary European Search Report, EP20768939.9, mailed May 25, 2022, 13 pages.
Sugimoto, K., et al., "Video coding technology proposal by Mitsubishi Electric", JCT-VC Meeting; Apr. 15, 2010-Apr. 23, 2010; (Joint Collaborative Team on Video Coding of ISO/IEC JTC1/SC29/WG11 and ITU-T SG.16), Document JCTVC-A107, Dresden, XP030232996, Apr. 12, 2010, 46 pages.
International Search Report and Written Opinion of the International Searching Authority, PCT/SE2020/050260, mailed Jun. 2, 2020, 14 pages.
Song, B.C., et al., "Motion-Compensated Temporal Filtering for Denoising In Video Encoder," Electronics Letters, Jun. 24, 2004, vol. 40, No. 13, 2 pages.
Schwarz, H., et al., "Analysis of Hierarchical B Pictures and MCTF," Proceedings of the 2006 IEEE International Conference on Multimedia and Expo, ICME 2006, Jul. 9-12, 2006, Hilton, Toronto, Ontario, Canada, 4 pages.
Wennersten, P., et al., "Encoder-Only GOP-Based Temporal Filter," 35th meeting of the Joint Collaborative Team on Video Coding (JCT-VC) of ITU-T SG 16 WP 3 and ISO/IEC JTC 1/SC 29/SG11, Document JCTVC-AI0023-v2, Geneva, CH, Mar. 22-27, 2019, 6 pages.

* cited by examiner

VIDEO CODING INVOLVING GOP-BASED TEMPORAL FILTERING

CROSS REFERENCE TO RELATED APPLICATIONS

This application is a 35 U.S.C. § 371 national stage application of PCT International Application No. PCT/SE2020/050260 filed on Mar. 10, 2020, which in turn claims domestic priority to U.S. Provisional Patent Application No. 62/816,617, filed on Mar. 11, 2019, the disclosures and content of which are incorporated by reference herein in their entirety.

TECHNICAL FIELD

Embodiments of the present disclosure relate to a method of video coding.

BACKGROUND

In a known process for encoding a sequence of pictures, each picture is indicated by a Picture Order Count (POC) number 0, 1, 2, 3, . . . , etc. The encoding process leads to a coded video sequence that starts with an independently coded image, referred to as an I-frame, i.e. the frame with the POC 0. After that, there are typically several frames which predict from at least one other frame, which we call B-frames. Typically, the coding is done hierarchically. First the I-frame, frame 0, is coded, then a frame which predicts from the I-frame, then a frame which predicts from the previously coded frames, and so on. The structure that defines how pictures can reference each other is known as a Group of Pictures (GOP) structure.

SUMMARY

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

According an embodiment of the present disclosure, there is provided a method for encoding a video signal, the method comprising: receiving an input comprising a sequence of pictures; selecting a subset of the pictures from the sequence; filtering the selected subset of the pictures from the sequence; applying the filtered selected subset of the pictures, and unfiltered pictures not in the selected subset, to an encoder to produce an encoded signal.

The selected subset of the pictures contains at least one picture, and does not contain all of the pictures.

Selecting the subset of the pictures may comprise selecting a subset of the pictures based on positions of the pictures in the sequence of pictures.

The method may comprise selecting the subset of the pictures based on a Picture Order Count (POC) number, number of references to this picture, position in the coding hierarchy or temporal ID.

Filtering the selected subset of the pictures from the sequence may comprise applying an overall filter strength value.

The overall filter strength value may be set depending on one or more of: a Picture Order Count (POC) number, number of references to this picture, position in the coding hierarchy or temporal ID.

The overall filter strength value may be set to a first value for pictures with a first temporal ID, and to a different second value for pictures with a second temporal ID.

The first value of the overall filter strength value may be higher than the second value, and the first temporal ID is lower than the second temporal ID.

Filtering the selected subset of the pictures from the sequence may further comprise: selecting at least one reference picture associated with each selected picture; and modifying pixel values in each selected picture based on corresponding pixel values in the at least one reference picture.

The step of modifying pixel values may comprise modifying at least one pixel value with reference to a weighted sum of corresponding pixel values in the at least one reference picture.

Weights applied to the pixel values may be based on a squared difference between the pixel and a corresponding pixel in the reference picture. Alternatively, weights applied to the pixel values may be based on a sum of squared differences between pixels in an area in the current frame and pixels in a corresponding area in the reference.

The method may comprise applying first weights in the luminance channel and second weights in the chrominance channel.

The at least one reference picture may comprise a predetermined number of pictures preceding the selected picture and a predetermined number of pictures following the selected picture.

The encoder may comprise a hybrid encoder.

According to a second aspect, there is provided a video encoder, comprising: a temporal filter for filtering an input, wherein the temporal filter is configured to operate in accordance with a method according to the first aspect, and an encoder for encoding the filtered pictures.

This increases the quality of the encoding, while also increasing the efficiency.

BRIEF DESCRIPTION OF DRAWINGS

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

DETAILED DESCRIPTION

Figure 1:
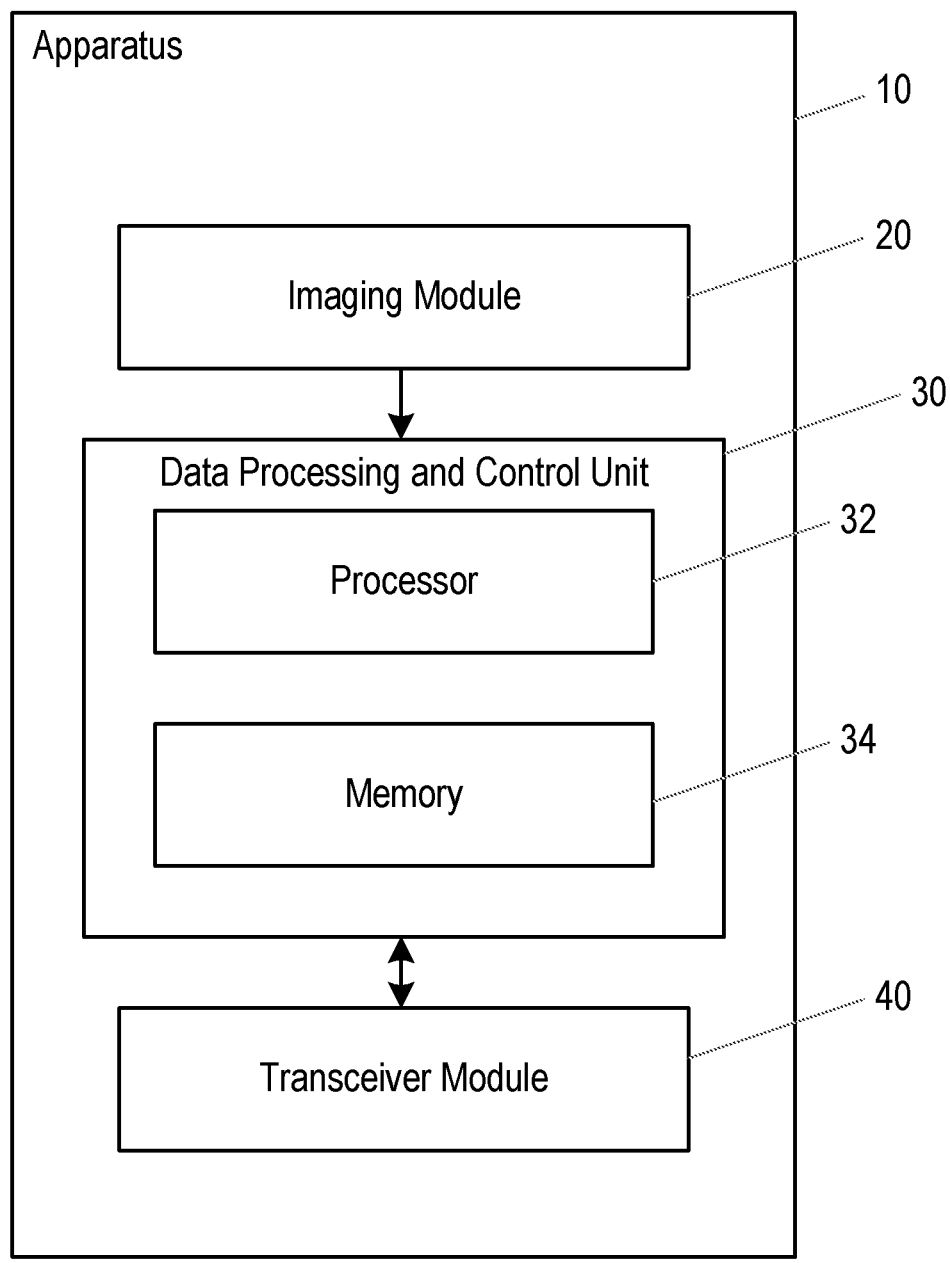
FIG. 1 shows an apparatus in accordance with an embodiment of the disclosure.

FIG. 1 shows an apparatus 10 in accordance with an aspect of the disclosure.

The apparatus 10 may for example be a portable computing apparatus such as a laptop, notepad or tablet computer, or may be a communications apparatus such as a smartphone. The apparatus 10 may also be a dedicated imaging device such as a video camera.

The apparatus 10 includes an imaging module 20, which includes optical devices such as lenses and one or more image sensor, for producing a sequence of pictures, which together form a video.

The apparatus 10 also includes a data processing and control unit 30, which is shown as comprising a processor 32 and a memory 34. The processor 32 and the memory 34 may each comprise a single unit, or may be made up of multiple units. For example, the video encoder described in more detail below may be located in a processing chip that also controls other operations of the apparatus 10, or may be provided in a separate video processing chip.

The apparatus 10 also includes a transceiver module 40, for communicating with other devices. In the case where the apparatus 10 is a portable computing apparatus or a communications apparatus, the transceiver module 40 may be a wireless communications transceiver, for communicating over a wireless communications network. In other examples, the transceiver module 40 may be configured to establish communication with at least one other device over a wired link.

Figure 2:
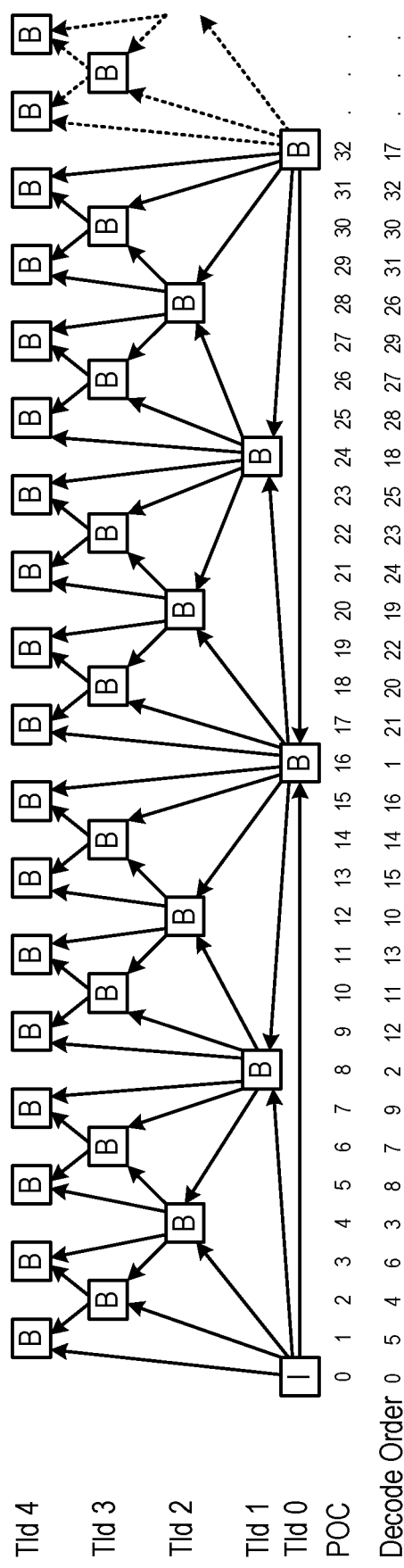
FIG. 2 illustrates a form of video encoding.

FIG. 2 illustrates a process of video coding.

Specifically, FIG. 2 shows the process of encoding a sequence of pictures, where each picture is indicated by a Picture Order Count (POC) number 0, 1, 2, 3, . . . , 32. The encoding process leads to a coded video sequence starts with an independently coded image, referred to as an I-frame, i.e. the frame with the POC 0.

After that, there are typically several frames which predict from at least one other frame, which we call B-frames. Typically, the coding is done hierarchically. First the I-frame, frame 0, is coded, then frame 16 which predicts from 1 is coded, then frame 8 which predicts from 0 and 16, and so on. FIG. 2 also indicates the coding order (which is the same as the decode order when the sequence is eventually decoded).

The structure shown in FIG. 2 is known as a Group of Pictures (GOP) structure. A GOP structure defines how pictures can reference each other and the per picture specific configuration. The GOP can be divided into temporal sub layers. In FIG. 2, there are 5 temporal sub layers, indicated by Temporal Identifiers (TId) 0-4. Pictures at a certain temporal sub layer can't reference pictures at a higher temporal sub layer.

FIG. 2 illustrates a typical example of a GOP structure for Random Access in High Efficiency Video Coding (HEVC), though it will be appreciated that many such structures are possible.

Each GOP has 16 pictures starting with a picture at TId 0. The arrows illustrate the references so, for example, POC 8 is used as reference for POC 4, 6, 7, 9, 10 and 12. The decode order, i.e. the order that the pictures are processed by the decoder, is typically optimized so that referenced pictures are coming as close as possible to a picture to minimize latency and memory usage.

One possibility, when trying to reduce noise in a video sequence, is to find areas in different frames that correspond to each other. This is accomplished by a process known as motion estimation. A filter can then be applied, replacing the pixel values with weighted pixel values from the same area in different frames, thus smoothing out the noise. We only want to average pixels that truly correspond to each other, so if the difference between their values is too large, we want to reduce the amount of filtering. This can be accomplished by e.g. using a bilateral filter.

When coding a video frame based on another frame, they often match very well, and it may be possible to simply copy over pixels from the previous frame without modification. There will typically still be small differences between the original frames though, and in order to minimize the overall error, we would like the pixels to resemble not just the original pixels in the frame they were first coded, but also the original pixels in all future frames where they will be re-used.

Figure 3:
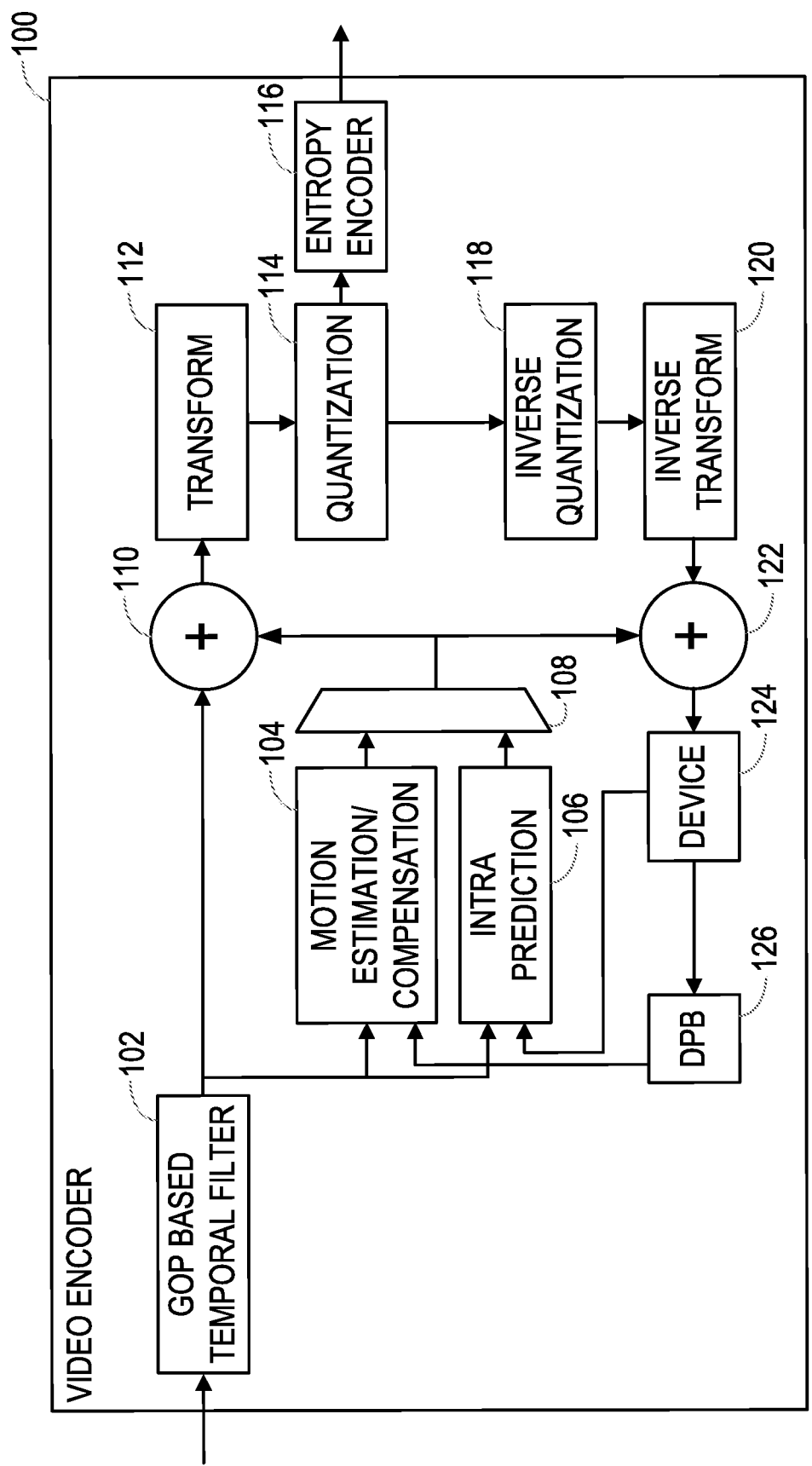
FIG. 3 illustrates a video encoder in accordance with an embodiment of the disclosure.

FIG. 3 illustrates a video encoder according to one aspect of the disclosure.

Specifically, FIG. 3 shows a video encoder 100, which includes a GOP-based temporal filter 102, which is connected directly or indirectly to an imaging module to receive a sequence of pictures. The pictures are read and then analyzed by the filter. Depending on high level properties, as described in more detail below, each picture is either filtered or untouched before further processing. In the embodiment shown in FIG. 1, a subset of the pictures from the sequence is selected; the selected subset of the pictures from the sequence is filtered; and the filtered selected subset of the pictures, and unfiltered pictures not in the selected subset, are applied to an encoder to produce an encoded signal. The subset contains at least one picture, and does not contain all of the pictures.

More specifically, in the embodiment shown in FIG. 1, the further processing takes place in a generally standard hybrid encoder.

Specifically, each picture output from the temporal filter 102 is passed to a motion compensation block 104 and an intra prediction block 106. Depending on the setting of a multiplexer 108, the output of either the motion compensation block 104 or the intra prediction block 106 is passed to a subtractor 110, where it is subtracted from the relevant picture output from the temporal filter 102.

The resulting picture is passed to a transform block 112, and then to a quantization block 114 as is conventional, with the output being passed to an entropy encoder 116 to produce an output that can be stored in memory 34 or supplied to the transceiver module 40.

The encoder also includes a reconstruction path to reconstruct a frame for encoding of further pictures. Specifically, the output of the quantization block 114 is passed to an inverse quantization block 118, and then to an inverse transform block 120.

The output of either the motion compensation block 104 or the intra prediction block 106 is passed to a second subtractor 122, where it is subtracted from the output of the inverse transform block 120, and the resulting signal is passed to the intra prediction block 106.

The resulting signal is also passed to a device block 124, where the reconstructed frame is written to disk or to storage or to a stream and then to a Decode Picture Buffer (DPB) block 126, where the frame is stored in memory for later decoding steps, and the result is passed to the motion compensation block 104.

Thus, the video encoder 102 includes what is essentially a temporal denoising filter, and the parameters of the filter 102 are based on the GOP structure and other parameters for the video being encoded.

As described in more detail below, a pixel value is modified by a weighted combination of the pixel value and temporally neighbouring pixel values in a filtering that depends on temporal ID and quantization parameter. The temporally neighbouring pixels are determined by motion compensation.

Figure 4:
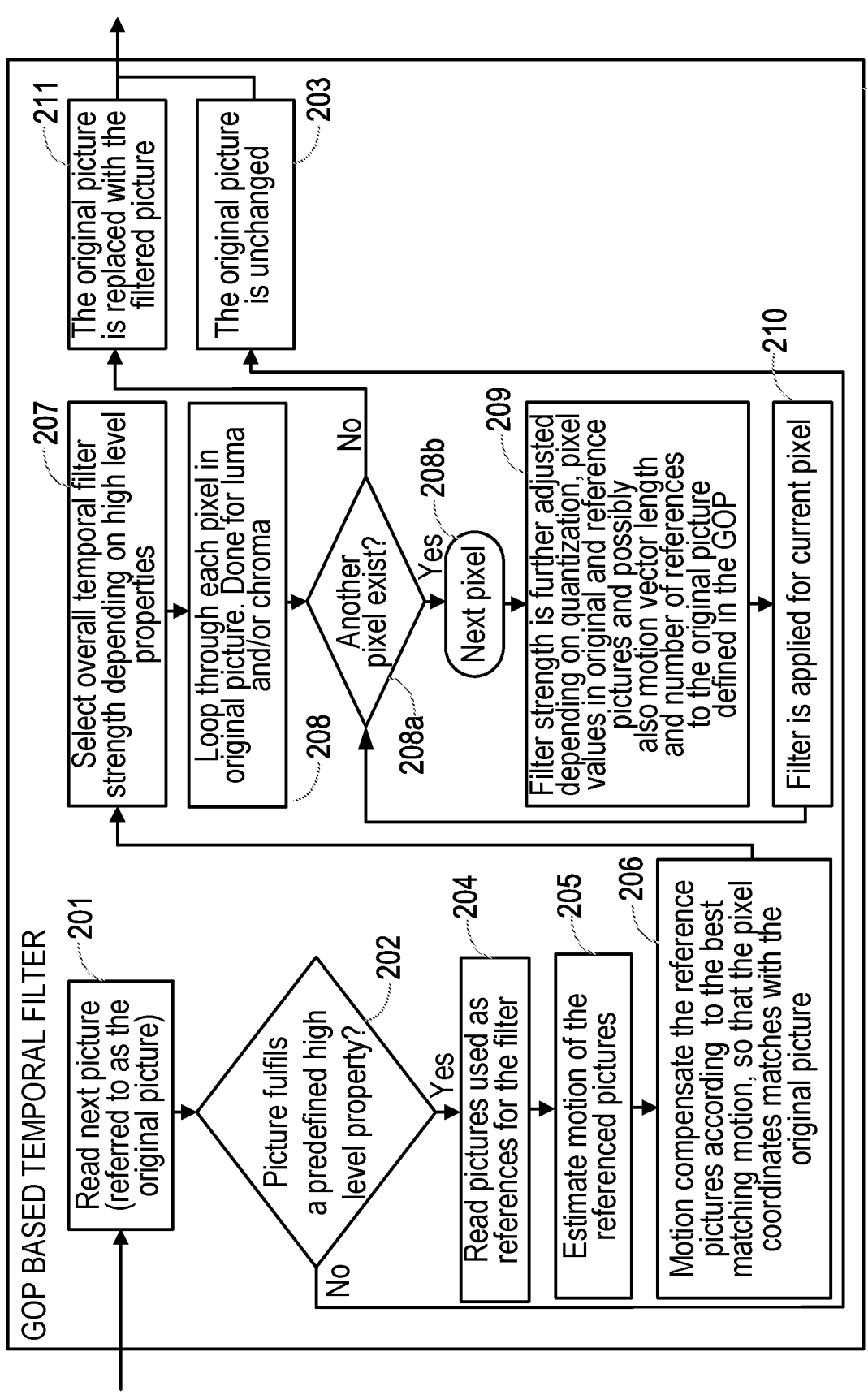
FIG. 4 is a flow chart illustrating a method of video encoding in accordance with an embodiment of the disclosure.

FIG. 4 is a flow chart, illustrating a method of operation of the filter 102 shown in FIG. 3.

At step 201 of the method, received pictures are read in a generally conventional way.

At step 202, it is determined whether a received picture fulfils certain high level properties. In some embodiments, pictures are selected based on positions of the pictures in the sequence of pictures. Thus, for example, a high level property used as the basis for the determination could be for example the POC number of the picture, the number of references to this picture, the position of the picture in the coding hierarchy or the temporal ID of the picture, as illustrated with reference to FIG. 2.

If the relevant high level property is not fulfilled, the process passes to step 203, and the originally received picture is passed unchanged, i.e. without filtering.

If the relevant high level property is fulfilled, the process passes to step 204, in which a configurable number of reference pictures before and/or after the selected picture (which is referred to below as the original picture) are read. In the edge cases, for example if the picture is the first or last picture or close to the first or last picture, only the available pictures are read.

At step 205, the motion of the reference pictures relative to the original picture is estimated per picture block.

Figure 5:
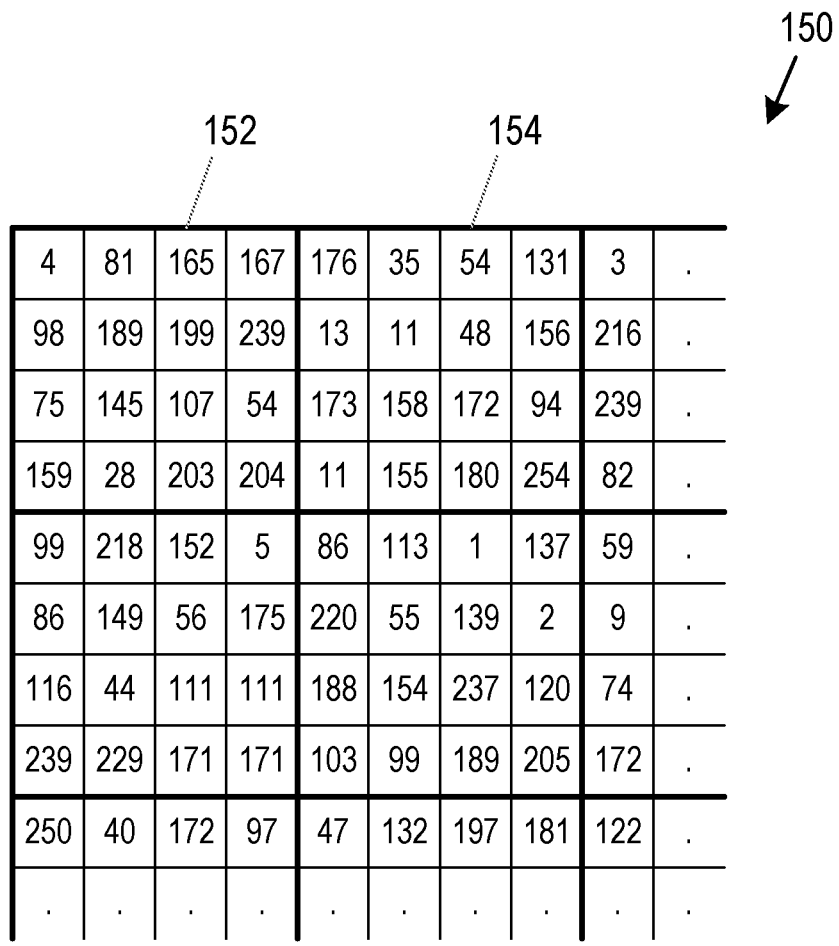
FIG. 5 illustrates a stage in the method of FIG. 4.

FIG. 5 illustrates this step. Specifically, FIG. 5 shows a part of a picture 150, where each small square represents a pixel, and the number inside the square represents a luminance and/or chrominance value of that pixel.

FIG. 5 shows the picture 150 divided into blocks 152, 154, where the blocks are separated by thicker lines, and each block has a size of 4 by 4 pixels.

In one embodiment, subsampling is used to search for larger motion and interpolation is used to search for smaller motion.

Figure 6:
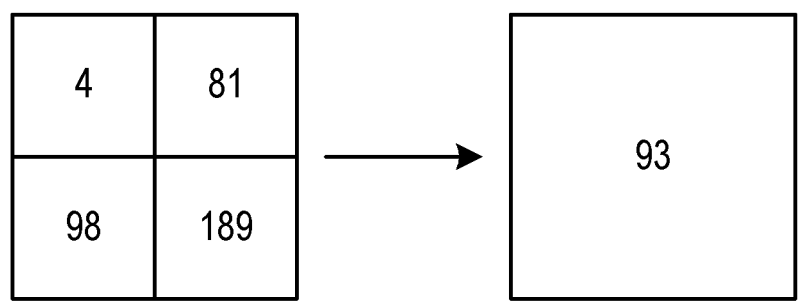
FIG. 6 illustrates a stage in the method of FIG. 4.

FIG. 6 illustrates one possible process of subsampling. Specifically, this involves constructing a picture with a lower resolution. FIG. 6 shows the block of 2×2 pixels in the top left corner of the picture 150 being replaced by a single pixel. Thus, the average of the four pixel values in the original 2×2 block is taken as the value of the single pixel. Thus, 93 is the average of the four pixel values 4, 81, 98, and 189.

At step 206 of the process shown in FIG. 4, motion compensation is applied on the reference pictures according to the best matching motion for each block, i.e. so that the pixel coordinates of the original picture in each block have the best matching coordinates in the referenced pictures.

At step 207, the overall strength of the temporal filter is set. Here, the filter strength can be set based on one or more of the high level properties mentioned above, for example the POC number of the picture, the number of references to this picture, or the position of the picture in the coding hierarchy or the temporal ID of the picture. In other embodiments, the number of pictures per second or any other feature of the configuration can be used for setting the overall filter strength.

At step 208, the pixels of the picture are processed one by one for the luma and/or chroma channels. Thus, at step 208a, it is determined whether there are any more pixels to be processed and, if so, the process passes to step 208b, where the next pixel is processed, until there are no further pixels.

At step 209, the filter strength is further adjusted, for example depending on a quantization parameter, pixel values in the original and reference pictures, and possibly also a motion vector length and a number of references to the original picture defined in the GOP.

The strength can be set differently for the luma- and chroma channels.

Spatially neighboring pixel values can also be taken into consideration for determining the filter strength.

At step 210, the filter is applied for the current pixel. The resulting pixel value is stored separately or possibly directly in the original depending on what information is required in step 209.

At step 211, the filtered picture is forwarded to the next steps in the encoder 100, as shown in FIG. 3. If the picture has not been selected for filtering, the unfiltered picture is forwarded to the encoder.

Features of one particular implementation are now described in more detail. It will be appreciated that these features can be implemented separately or together, in any combination or sub-combination.

Thus, in step 202 of the method shown in FIG. 4, the determination as to whether the picture is selected is made based on the number of pictures read. Depending on the particular GOP structure, this determination corresponds to a determination based on the temporal layer, or the Temporal Identifier TId.

Specifically, in one embodiment, if n mod 8≠0 the frame is not further processed, where n is the number of pictures read. Otherwise the picture is further processed. Thus, the pictures with POC 0, 8, 16, 24 etc are further processed, and the other pictures are passed to the encoder without filtering. In the GOP structure shown in FIG. 2, n mod 8≠0 corresponds to the temporal layer being larger than 1. More generally, the determination in step 202 can be made such that only pictures with a TId equal to or lower than a threshold level are filtered.

In step 204, the configurable number of reference pictures can be set to two pictures preceding the original picture and two pictures after the original picture, which are read if they are available. Hence there are up to four reference pictures. However, there may be fewer than four reference pictures. For example, at n=0 there are no preceding pictures, and so there are only two reference pictures.

At step 207, the overall filter strength is set.

In some embodiments, the value of the overall filter strength is set based on one or more high level properties. For example, the value of the overall filter strength may be set based on the number of pictures read. Depending on the particular GOP structure, this corresponds to a determination based on the temporal layer, or TId.

For example, if the determination in step 202 is such that only pictures with a TId equal to or lower than a threshold level are filtered, the overall filter strength may be set in step 204 such that a first filter strength value is applied to pictures with a TId equal to that threshold level, and a second filter strength value is applied to pictures with a TId below that threshold level.

In one example the overall filter strength, $s_o$, is set according to the equation below.

$$s_o(n) = \begin{cases} 1.5, & n \bmod 16 = 0 \\ 0.95, & n \bmod 16 \neq 0 \end{cases}$$

Thus, an overall filter strength of 1.5 is applied to pictures with a temporal id 0 and an overall filter strength of 0.95 is applied to pictures with a temporal id 1.

Thus, in this example, if the pictures with POC 0, 8, 16, 24 etc are further processed, as described with reference to step 202, an overall filter strength of 1.5 is applied to the pictures with POC 0, 16, etc, and an overall filter strength of 0.95 is applied to pictures with POC 8, 24 etc.

At step 209, a new pixel value is calculated. Specifically in this illustrated embodiment, a new pixel value, $I_n$, is calculated using the following formula.

$$I_n = \frac{I_o + \sum_{i=0}^{3} w_r(i, a) I_r(i)}{1 + \sum_{i=0}^{3} w_r(i, a)}$$

Where $I_o$ is the pixel value of the original pixel, $I_r(i)$ is the intensity of the corresponding pixel of reference i and $w_r(i, a)$ is the weight of reference i when the number of available references is a.

In the luma channel, the weights, $w_r(i, a)$, are defined as follows:

$$w_r(i, a) = s_l s_o(n) s_r(i, a) e^{-\frac{\Delta I(i)^2}{2\sigma_l(q)^2}}$$

Where $s_l = 0.4$ $$s_r(i, 2) = \begin{cases} 1.2, & i = 0 \\ 1.0, & i = 1 \end{cases}$$

$$s_r(i, 4) = \begin{cases} 0.85, & |i - 1.5| = 0.5 \\ 0.60, & |i - 1.5| = 1.5 \end{cases}$$

For all other cases of i, and a: $s_r(i, a) = 0.3$ $\sigma_l(q) = 3(q - 10)$ $\Delta I(i) = I_r(i) - I_o$ For the chroma channels, the weights, $w_r(i, a)$, are defined as follows:

$$w_r(i, a) = s_c s_o(n) s_r(i, a) e^{-\frac{\Delta I(i)^2}{2\sigma_c^2}}$$

Where $s_c = 0.55$ and $\sigma_c = 30$

In an alternative embodiment, rather than basing the weight on the squared difference between the pixel and the corresponding pixel in the reference frame, it is based on the sum of squared differences between an area in the current frame and a corresponding area in the reference.

Thus, as described above, a selected sub set of pictures are temporally filtered at the input to encoder. The filtering is done outside the coding loop. The filter strength may be adjusted according to temporal, spatial and intensity differences between pixels and also quantization parameters.

Figure 7:
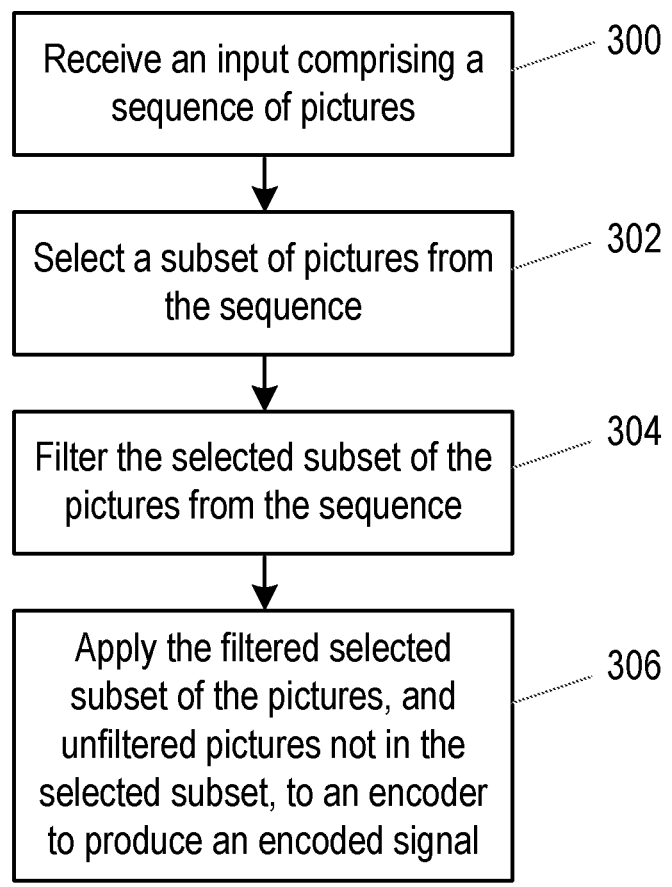
FIG. 7 is a flow chart illustrating a method of video encoding in accordance with an embodiment of the disclosure.

FIG. 7 is a flow chart, illustrating a method for encoding a sequence of pictures.

The method starts at step 300, with receiving an input comprising a sequence of pictures. At step 302, a subset of the pictures from the sequence is selected. The subset contains at least one picture, and does not contain all of the pictures in the sequence. At step 304, the selected subset of the pictures from the sequence is filtered. At step 306, the filtered selected subset of the pictures, and unfiltered pictures not in the selected subset, are applied to an encoder to produce an encoded signal.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In another embodiment, there is provided a computer program product comprising a computer readable medium, the computer readable medium having computer readable code embodied therein, the computer readable code being configured such that, on execution by a suitable computer or processor, the computer or processor is caused to perform any of the embodiments of methods described herein, such as embodiments of the methods described above in respect of FIGS. 4 to 7.

Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for encoding a sequence of pictures, the method comprising:
   receiving an input comprising a sequence of pictures;
   selecting a subset of pictures from the sequence of pictures;
   filtering the selected subset of pictures according to an overall filter strength applied to one or more pictures of the selected subset of pictures, wherein the overall filter strength applied to a picture in the selected subset of pictures is adjusted for each pixel of the picture such that a filter strength applied to each pixel of the picture depends upon pixel values in the picture; and
   applying the filtered selected subset of pictures, and unfiltered pictures from the sequence of pictures that are not in the selected subset of pictures, to an encoder to produce an encoded sequence of pictures.

2. The method according to claim 1, wherein selecting the subset of pictures comprises selecting the subset of pictures based on positions of pictures in the sequence of pictures.

3. The method according to claim 1, further comprising selecting the subset of pictures based on at least one of a Picture Order Count, POC, number, a number of references to a picture, a position in a coding hierarchy or a temporal ID.

4. The method according to claim 1, wherein filtering the selected subset of pictures comprises applying an overall filter strength value of the overall filter strength.

5. The method according to claim 4, wherein the overall filter strength value is set depending on at least one of a Picture Order Count, POC, number, a number of references to a picture, a position in a coding hierarchy or a temporal ID.

6. The method of claim 5, further comprising:
   selecting and setting the overall filter strength value equal to a first value for pictures having a POC value, n, such that n mod 16 is equal to 0;
   otherwise, selecting and setting the overall filter strength value equal to a second value for pictures having a POC value, n, such that n mod 8 is equal to 0; and
   otherwise, not selecting and not filtering the picture.

7. The method according to claim 4, wherein the overall filter strength value is set to a first value for pictures with a first temporal ID, and is set to a different second value for pictures with a second temporal ID.

8. The method according to claim 7, wherein the first value of the overall filter strength value is higher than the second value, and the first temporal ID is lower than the second temporal ID.

9. The method of claim 4, wherein the overall filter strength value is set depending on a temporal ID value, the method comprising:
   setting the overall filter strength value equal to a first value for pictures having a temporal ID equal to 0; and
   setting the overall filter strength value equal to a second value for pictures having a temporal ID equal to 1.

10. The method according to claim 4, wherein filtering the selected subset of pictures comprises:
    selecting at least one reference picture associated with each selected picture; and
    modifying pixel values in each selected picture based on corresponding pixel values in the at least one reference picture.

11. The method according to claim 10, wherein modifying the pixel values comprises modifying at least one pixel value with reference to a weighted sum of corresponding pixel values in the at least one reference picture.

12. The method according to claim 11, wherein weights applied to the pixel values are based on a squared difference between the pixel and a corresponding pixel in the reference picture.

13. The method according to claim 11, wherein weights applied to the pixel values are based on a sum of squared differences between pixels in an area in the current frame and pixels in a corresponding area in the reference.

14. The method according to claim 11, comprising applying first weights in a luminance channel and second weights in a chrominance channel.

15. The method according to claim 10, wherein the at least one reference picture comprises a predetermined number of pictures preceding the selected picture and a predetermined number of pictures following the selected picture.

16. The method according to claim 1, wherein the encoder comprises a hybrid encoder.

17. A video encoder, comprising:
    a temporal filter for receiving an input comprising a sequence of pictures, selecting a subset of pictures from the sequence of pictures, filtering the selected subset of pictures according to an overall filter strength applied to one or more pictures of the selected subset of pictures, wherein the overall filter strength applied to a picture in the selected subset of pictures is adjusted for each pixel of the picture such that a filter strength applied to each pixel of the picture depends upon pixel values in the picture; and
    an encoder for applying the filtered selected subset of pictures, and unfiltered pictures from the sequence of pictures that are not in the selected subset of pictures, to produce an encoded sequence of pictures.

18. A computer program product, comprising a non-transitory computer readable medium having computer readable code, to be executed by a suitably programmed processor to perform operations comprising:
  receiving an input comprising a sequence of pictures;
  selecting a subset of pictures from the sequence of pictures;
  filtering the selected subset of pictures according to an overall filter strength applied to one or more pictures of the selected subset of pictures, wherein the overall filter strength applied to a picture in the selected subset of pictures is adjusted for each pixel of the picture such that a filter strength applied to each pixel of the picture depends upon pixel values in the picture; and
  applying the filtered selected subset of pictures, and unfiltered pictures from the sequence of pictures that are not in the selected subset of pictures, to an encoder to produce an encoded sequence of pictures.

\* \* \* \* \*